US010145972B2

(12) United States Patent
Owen et al.

(10) Patent No.: US 10,145,972 B2
(45) Date of Patent: Dec. 4, 2018

(54) SYSTEMS AND METHODS FOR ADVANCED RAPID IMAGING AND ANALYSIS FOR EARTHQUAKES

(71) Applicant: CALIFORNIA INSTITUTE OF TECHNOLOGY, Pasadena, CA (US)

(72) Inventors: Susan Ethel Owen, Pasadena, CA (US); Angelyn W. Moore, Pasadena, CA (US); Zhen Liu, Pasadena, CA (US); Sang Ho Yun, Pasadena, CA (US); Hook Kian Hua, Pasadena, CA (US); Gian Franco Sacco, Pasadena, CA (US); Timothy M. Stough, Pasadena, CA (US); Costin Radulescu, Pasadena, CA (US); Eric J. Fielding, Pasadena, CA (US); Paul A. Rosen, Pasadena, CA (US); Frank H. Webb, Pasadena, CA (US); Jennifer W. Cruz, Pasadena, CA (US); Mark Simons, Pasadena, CA (US); Piyush Shanker Agram, Pasadena, CA (US); Paul Randall Lundgren, Pasadena, CA (US); Gerald John Maramba Manipon, Pasadena, CA (US); Michael David Starch, Pasadena, CA (US); Brian Wilson, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 252 days.

(21) Appl. No.: 14/828,348

(22) Filed: Aug. 17, 2015

(65) Prior Publication Data
US 2016/0047940 A1    Feb. 18, 2016

Related U.S. Application Data

(60) Provisional application No. 62/037,742, filed on Aug. 15, 2014.

(51) Int. Cl.
G06F 19/00    (2018.01)
G01V 1/28     (2006.01)
G01V 1/00     (2006.01)

(52) U.S. Cl.
CPC .............. *G01V 1/288* (2013.01); *G01V 1/008* (2013.01)

(58) Field of Classification Search
CPC .......... G02B 2027/0178; G02B 27/017; G02G 27/0093

(Continued)

(56) References Cited

U.S. PATENT DOCUMENTS 7,277,797 B1 *  10/2007  Kunitsyn ............... G01V 1/008
                                                       702/15
2004/0075552 A1   4/2004  Rao et al.

(Continued)

FOREIGN PATENT DOCUMENTS

WO    2016025956 A1    2/2016

OTHER PUBLICATIONS

International Preliminary Report on Patentability for International Application PCT/US2015/045557, dated Feb. 21, 2017, dated Mar. 2, 2017, 5 Pgs.

(Continued)

*Primary Examiner* — Edward Raymond
(74) *Attorney, Agent, or Firm* — KPPB LLP

(57) ABSTRACT

Many embodiments provide a hybrid data processing system (HySDS) of an end-to-end geodetic imaging data system enabling near-real-time science, assessment, response, and rapid recovery. The HySDS may be an operation data processing system that integrates data from many different geodetic data sources and/or sensors, including interferometric synthetic aperture radar (InSAR), GPS, pixel tracking, seismology, and/or modeling, and processes the data to (Continued)

generate actionable high quality science data products. The HySDS may provide for an automated imaging and analysis capabilities that is able to handle the imminent increases in raw data from new and existing geodetic monitoring sensor systems.

24 Claims, 13 Drawing Sheets

(58) Field of Classification Search
USPC .............. 702/2, 3–6, 13, 14, 182–185, 188
See application file for complete search history.

(56) References Cited

U.S. PATENT DOCUMENTS

| | | |
|---|---|---|
| 2011/0169634 A1 | 7/2011 | Raj et al. |
| 2012/0319893 A1 | 12/2012 | Yun et al. |
| 2013/0332072 A1 | 12/2013 | Janky |

OTHER PUBLICATIONS

International Search Report and Written Opinion for International Application PCT/US2015/045557, Search completed Nov. 30, 2015, dated Nov. 30, 2015, 7 Pgs.

Lofgren et al., "Tropospheric correction for InSAR using interpolated ECMWF data and GPS Zenith Total Delay from the Southern California Integrated GPS Network", 2010 IEEE International Geoscience and Remote Sensing Symposium, Jul. 25-30, 2010, Honolulu, HI, USA, pp. 4503-4506.

\* cited by examiner

US 10,145,972 B2

SYSTEMS AND METHODS FOR ADVANCED RAPID IMAGING AND ANALYSIS FOR EARTHQUAKES

CROSS REFERENCE TO RELATED APPLICATIONS

This application claims the benefit of U.S. Provisional Patent Application No. 62/037,742 filed on Aug. 15, 2014, the disclosure of which is hereby incorporated by reference in its entirety.

STATEMENT OF FEDERAL SUPPORT

The invention described herein was made in the performance of work under a NASA contract, and is subject to the provisions of Public Law 96-517 (35 U.S.C. 202) in which the Contractor has elected to retain title.

FIELD OF INVENTION

The present invention relates to the field of geodetic analysis and in particular, to hybrid cloud-based data processing systems for processing real-time geodetic sensor data for scientific purposes, hazard assessment and/or situational awareness.

BACKGROUND

The technology behind earth science observations has advanced to the stage where there are now many sources of geodetic data (e.g., satellite, Global Position System (GPS), seismic networks) being made available by many different agencies (e.g., National Aeronautics and Space Administration (NASA), European Space Agency, Italian Space Agency (ASI)). However, scientists have struggled with being able to derive useful observations from the sea of data due to a lack of viable tools at their disposal that are capable of handling the large quantities of data in a timely and efficient manner.

Furthermore, space agencies from around the globe are regularly launching missions to study the earth system, and data policies are becoming increasingly open. As the costs fall for installing 24-7 monitoring systems, the quantity of geodetic data available is skyrocketing, in effect generating a "tsunami" of data. Likewise, it is expected that the various monitoring systems producing geodetic data will soon be capable of obtaining nearly global coverage of Earth by satellites. This will be achieved by upcoming launches of radar missions from various space agencies across the world. In addition, more GPS networks are installed every year, with increasing numbers capable of delivering real-time high-rate data. Observations from the global constellations of satellites, combined with the ongoing acceleration in observations from dense GPS networks may enable a quantum leap in the contributions of space geodesy to studies of Earth's surface and interior.

SUMMARY OF THE INVENTION

Many embodiments of the invention provide for a hybrid (e.g., on-premise and/or cloud-based) science data system (HySDS) for efficiently processing geodetic sensor data to generate higher-level data products (e.g., interferograms, time series velocity maps, GPS results, coherence maps, advisory alerts, damage proxy maps, among other products).

In an embodiment, a hybrid data system (HySDS) for processing geodetic data includes: an on-premise cloud science data system infrastructure that communicates with an external cloud-based system infrastructure, the HySDS infrastructure includes a processor configured to communicate with a memory, wherein the memory contains computer instructions that direct the processor to: monitor availability of geodetic data from distributed data centers and characterization of the geospatial extents and instrument sensor metadata, monitor geodetic data sensed by at least one geodetic sensor based on a plurality of parameters, wherein the monitoring includes analyzing the geodetic data for triggering events, detect an occurrence of a triggering event based on the monitoring of the geodetic data, determine a time threshold by which at least one high level data product is to be generated upon occurrence of the triggering event, determine that the current available resources of the HySDS are insufficient for processing of the geodetic data and communicate with the cloud-based system infrastructure in order to allocate additional computing resources available on the cloud-based system infrastructure based on an estimate of computing resources needed to process the geodetic data to generate the at least one high level product, process the geodetic data using the on-premise and cloud-based infrastructure to generate the at least one high level product.

In another embodiment, the HySDS further publishes the at least one high level product, where the at least one high level product is accessible by a user.

In a yet further embodiment, the geodetic data provides information regarding a ground surface.

In a yet further embodiment again, the geodetic data measures surface deformations and movement of a ground surface.

In still another embodiment, the geodetic data is data selected from the group consisting of interferometric synthetic aperture radar data (InSAR), seismic data, and global position data.

In a still another embodiment again, the InSAR data measures a signal phase change between a plurality of images over a particular area of a ground surface at different times such that it is able to detect a movement of a point on the ground surface.

In another embodiment again still, the detected phase change is corrected for the amount of delay caused by tropospheric water vapor, using GPS array and weather model data.

In a yet another embodiment, the triggering event is an imminent increase in volume of geodetic data.

In still another embodiment again, the triggering event is a disaster that causes a land deformation in a particular region.

In a still further embodiment again, the disaster is a disaster selected from the group consisting of a fire, an earthquake, a tsunami, a tornado, a hurricane, a volcanic event, a flood, a mud-slide, and a terrorist attack.

In still another embodiment, the disaster is an earthquake, wherein the geodetic data provides deformation measurements that allow for computing a location and extent of a fault rupture.

In another embodiment again, the high level product is selected from the group consisting of a damage proxy map, an interferogram, a time series velocity map, a coherence map, and an advisory alert.

In another embodiment still again, the high level product is a damage proxy map, wherein the memory further directs the processor to obtain data from a plurality of devices regarding statuses of a plurality of regions within the damage proxy map.

In another still further embodiment, a status of a region in a damage proxy map is selected from the group consisting of damaged, undamaged, uncertain, damaged and verified, and undamaged and verified.

In a further embodiment, the memory further directs the processor to integrate data from a plurality of geodetic data sensors.

In still a further embodiment, the plurality of parameters for monitoring the geodetic data is specified by a user.

In another embodiment again still, determining that the current available resources of the HySDS are insufficient for processing the geodetic data further comprises detecting an imminent increase in data from the plurality of geodetic sensors.

In a further embodiment again, the cloud-based system infrastructure is provided by an external provider.

In a yet another embodiment again, the memory further directs the processor to integrate geodetic data from a plurality of geodetic data systems and processing the integrated geodetic data to generate at least one high level product.

In another embodiment again, the memory further directs the processor to determine that a set of currently available resources of the cloud-based infrastructure are not being used and scale down the cloud-based infrastructure to release the set of unused resources back to an on-premise and/or external provider.

In yet another embodiment again, the cloud-based system infrastructure monitors the geodetic data being sensed by the at least one geodetic sensor.

In still a further embodiment, processing the geodetic data comprises concurrently using a plurality of processors of the on-premise and cloud-based system infrastructures.

In another embodiment, the memory further directs the processor to retrieve geodetic data from an archive database upon detecting the occurrence of the triggering event, and process the retrieved geodetic data and new incoming geodetic data to generate the at least one high level product In still a further embodiment again, the retrieved geodetic data comprises InSAR data for a particular region prior to the occurrence of the triggering event.

DETAILED DESCRIPTION

Figure 1:
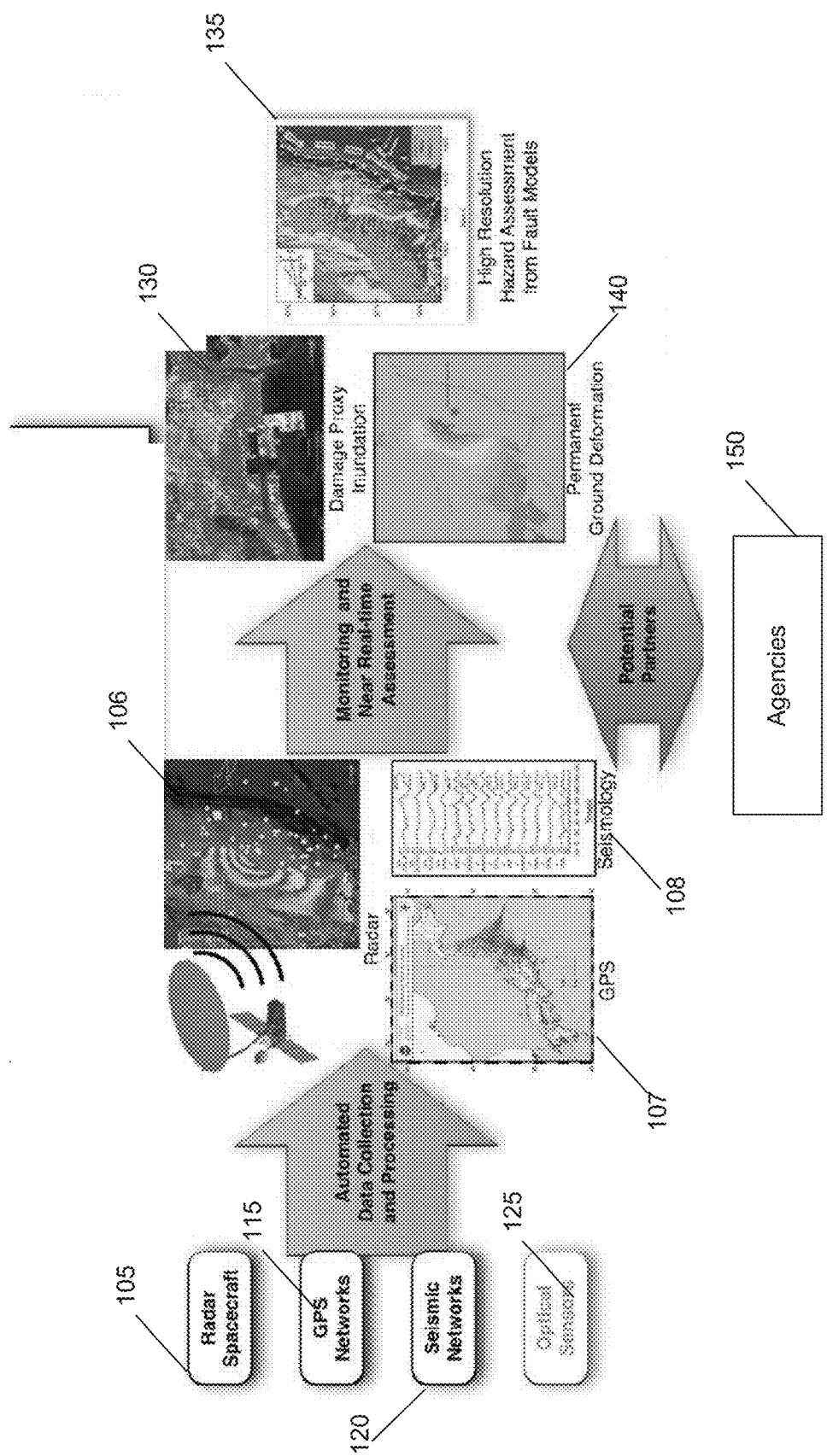
FIG. 1 is a diagram of a hybrid science data system (HySDS) that may be utilized to collect and process low level geodetic sensor data to generate high level products in accordance with an embodiment of the invention.

As described above, with the rapid increases in geodetic data being made available, many existing earth science systems do not have the necessary computing resources and/or system infrastructure that is required in order to be able to efficiently process the data and provide useful observations to both scientists and/or non-scientists. Thus, many embodiments of the invention provide for a hybrid (e.g., on-premise and/or cloud-based) science data system (HySDS) for efficiently processing geodetic sensor data to generate higher-level data products (e.g., interferograms, time series velocity maps, GPS results, coherence maps, advisory alerts, damage proxy maps, among other products). The geodetic sensor data may be different types of geodetic data (e.g., satellite data, GPS data, and/or seismic data) collected from different sources and/or sensor systems, including international space agencies, governments, private companies, among various other sources.

In particular, with the near daily temporal sampling of the Earth's active deformation by many different geodetic monitoring sensor systems, the HySDS may be used to analyze this geodetic data in order to generate high-level products that may be used for many different purposes by different users. For example, in some embodiments, the data may be analyzed for responding to natural disasters (fires, earthquakes, volcanic eruptions, floods, oil spills). The high-level products may include, for example, generating a damage proxy map that indicates damaged regions within an earthquake affected area. As will be described in detail below, in order to process the continuous large volumes of incoming data to generate the high-level data products (e.g., damage proxy maps), many embodiments of the HySDS provide a system architecture that has been designed to utilize elastic cloud-based computing resources on an "as-needed" basis, based on, for example, the changing processing and/or other computational needs of the HySDS at a particular time.

Furthermore, the increases in spatial and temporal coverage of geodetic sensors have also allowed for the development of a HySDS with low-latency access to geodetic sensor data. In particular, the HySDS may obtain real-time data from many different sources. Accordingly, many embodiments of the HySDS may also continuously monitor and process the geodetic sensor data being collected in order to detect the occurrence of "triggering events" (e.g., earthquakes, volcanic activity) and, in response, automatically generate scientifically useful high-level data products (e.g., damage proxy maps). As described above, the particular set of conditions for identifying a "triggering event" within the monitored data may be specified based on the particular preferences of individual users (and/or their objectives with respect to monitoring the data) using the HySDS.

For example, a particular scientist (or group of scientists) may be interested in monitoring the geodetic sensors for earthquake data confined to a particular region (e.g., Los Angeles) and the HySDS may automatically generate high level data products based on earthquakes occurring within this region. Other users may define other conditions for the monitoring of the geodetic data for triggering events, including the type of geodetic data to analyze, spatial and temporal constraints, the magnitude of an occurrence of an event as detected from the data (e.g., only earthquakes larger than 4.0 on the Richter scale), among many other conditions. Accordingly, any of a variety of parameters and/or conditions may be specified by users of the HySDS to trigger events based on their particular preferences and/or objectives for monitoring geodetic data.

As described above, each of the geodetic monitoring sensors, including the constellations of satellites, may likely produce a "data tsunami" on the order of terabytes of data per day or petabytes per year that requires significant computing resources for processing the data. These data may be multipurpose and heterogenous, and thus for the science community to fully exploit them for large-scale science problems, a HySDS may provide a much more comprehensive, elastic and scalable approach to data processing and synthesis. In the past, the sheer volume of data combined with the associated processing burden and different uses for the data had required individual users or groups of users to find a specific subset of data and learn the detailed low level processing chain for observations from each observing platform. Accordingly, many embodiments of the HySDS may automate and streamline this process in such a way that it now permits scientists to focus on how to further exploit the observations in research and application. Thus many embodiments provide a HySDS capable of serving the different needs of many different users, including individual scientists, first responders (e.g., firefighters), and/or various other centralized analysis centers.

Accordingly, many embodiments of the invention provide a HySDS of an end-to-end geodetic imaging data system enabling near-real-time science, assessment, response, and rapid recovery. In many embodiments, the HySDS may be an operation data processing system that (1) integrates data from many different geodetic data sources and/or sensors, including interferometric synthetic aperture radar (InSAR), GPS, pixel tracking, seismology, and/or modeling, and (2) processes the data to generate actionable high quality science data products (e.g., interferograms, damage proxy maps, time series velocity maps, GPS results, coherence maps, advisory alerts, among other products). In many embodiments, the HySDS provides for an automated imaging and analysis capabilities that is able to handle the imminent increases in raw data from new and existing geodetic monitoring sensor systems (e.g., InSAR satellites). In many embodiments, the HySDS may deliver updated actionable products via interoperable services and data formats.

In many embodiments, the HySDS may be a hybrid cloud-based data processing system that provides a set of monitoring data products to decision support and scientific end users. In particular, the HySDS may utilize both on-site and off-site (i.e., "cloud-based") elastic computing infrastructures. The cloud-based infrastructure may be provided by a third-party provider (e.g., Amazon Web Services, Amazon GovCloud (US), Google Cloud Platform, Microsoft Cloud) and may be utilized on an elastic "as-needed" basis based on, for example, the real-time computing needs of the HySDS. In particular, the processing of geodetic data may continuously fluctuate over time based on many different factors, including the amount of geodetic data being made available to the HySDS at a particular time, an occurrence of a "triggering event" that may significantly increase the computational resources needed to analyze the event for a certain time period, among many other factors. For example, volcano observatories specifying regions and products of interest via web portal or REST services interface may trigger the HySDS to continually monitor the data archives of the geodetic monitoring sensors for new relevant data, and process new scenes and GPS data as it becomes available.

As described above, many embodiments of the HySDS are able to provide a two-tiered cloud-based computing approach. This allows for the extension of a data processing system's local processing capabilities to a vast and elastic on-demand infrastructure on the cloud. The HySDS may utilize a large number of independent processors at cloud sites to process much of the geodetic data in parallel, such that simple temporal reductions such as stacking may occur very quickly. For more complex analyses, the HySDS may organize the computing in a manner that facilitates quick throughput. This may extend far beyond simple code parallelization by re-architecting typical flow pipelines to take advantage of the virtually limitless and elastic compute capacity available concurrently in the cloud environment.

In several embodiments, the data discovery, processing, and/or distribution may be executed in a regional cloud endpoint that is closest to the data archive centers. The HySDS may then distribute the data products from the cloud regional endpoints to the intended users. In certain embodiments, a web portal may also provide services to generate files needed to visualize the products (e.g., via Google Earth). For example, InSAR images within updated information on Kilauea Volcano's deformation status may be transmitted to Hawaii Volcano Observatory (HVO) as available. The extent of a fissure eruption may then be easily identified from the InSAR image. In many embodiments, the HySDS may provide a data latency in a matter of a mere few "hours", rather than several "days" as was typical with previous systems that often required actual human observations in order to generate data products such as damage proxy maps. This decrease in latency may thus allow for the rapid assessment of the data in real-time for immediate analysis and decision making. Continuing with the volcano example, the data set may provide scientists at HVO constraints on the extent of the eruptive activity, in particular the effects of subsurface magma migration that would otherwise be difficult to observe from aerial surveys. Furthermore, the scientists would be able to make more informed conclusions regarding the future hazard of this type of fissure eruption.

Many embodiments of the HySDS provide multi-faceted capabilities including effective federated data handling, data discovery, data and service interoperability, as well as collaborative methods for understanding and sharing scientific results among cross-disciplinary communities. In many embodiments, the HySDS provides for automated data processing of InSAR and/or GPS data that may enable detecting precursory deformation as well as generation of multi-level data products for science and monitoring of on-going hazardous activities around the globe.

In many embodiments, the HySDS allows individual scientists and engineers the ability to produce higher-level products (e.g., radar interferograms, damage proxy maps) without requiring local computational or data storage resources. Rather, the user may select a set of data to be processed, the particular algorithms with which to analyze the data, and the user may then receive the relevant processed subset on a device of the user. For example, scientists in the field may access InSAR analyses and specify how the data will be processed by the HySDS and what products will be produced.

Geodetic data, including InSAR data, may be archived at different places around the world and certain embodiments of the HySDS may find the location of data in one or more of these archives for a particular study locale and move the desired scenes to a cloud-based facility. The selected processing algorithm may then reduce the raw data to high-level data products. The product in useful format may then be provided to a user's device.

In many embodiments, the HySDS may provide an integrated service for InSAR and GPS data processing in an elastic computing paradigm that may be used for monitoring and response to globally distributed hazards. In particular, the global coverage offered by satellite-based SAR missions and rapidly expanding GPS networks may provide orders of magnitude more observations, and the HySDS may be used to efficiently analyze this voluminous data, and provide users with tools to access data products for their regions of interest.

Many embodiments of the HySDS may be used to detect the occurrence of an earthquake, flood, fire, hurricane, landslide, terrorist attack, among any other type of disaster that may occur, and provide high level data products (e.g., a damage proxy map that identifies the locations of damaged regions), which may be used by, for example, first responders for rescue efforts. In particular, many GPS networks now provide data in near real-time or real-time data streams, and seismic networks are almost all near real-time or real-time, and thus this data may be utilized by the HySDS rapidly during and/or immediately after the occurrence of an event.

In many embodiments, the HySDS may rapidly extract high-level data products from geodetic data, including GPS and/or InSAR. The HySDS may be used to ingest and process data from different agencies (e.g., NASA, ASI). For the detection of earthquakes, for example, the data may cover tectonically active parts of the Earth. The HySDS may automatically download, ingest, and catalog the data, and process the data using a variety of different processing algorithms.

For an earthquake type of event, the HySDS may analyze the combination of geodetic and seismic data together in order to determine an earthquake fault slip location and time and to provide a picture of the fault slip evolution during large earthquakes. Furthermore, the HySDS may obtain satellite and/or airborne SAR or optical imagery within hours of an event (if assets are fortunately passing the site), or within a few days in most cases. The high-resolution InSAR and pixel tracking may provide valuable information on the locations of surface deformations and/or ruptures that can aid field investigations. In several embodiments, the HySDS may rapidly determine deformation measurements from geodetic data, which may include any combination of sensor data (e.g., satellite, seismic, GPS) in order to obtain early estimates of the location and extent of damaged areas, fault ruptures, and/or other types of land deformations, which may in turn enable refinement of prediction of the areas affected by strong shaking that could case damage to building and other infrastructure. Different types of disasters may be analyzed with different types and/or combinations of sensor data using specialized processes for analyzing the particular type of disaster. For example, earthquakes may be analyzed using a combination of InSAR, GPS, and/or seismic data to determine the location and magnitude of the earthquake, the areas that experienced the largest levels of shaking (and thus likely resulted in more damage), among various other factors. Likewise, for a hurricane disaster, the HySDS may analyze InSAR and/or GPS data to detect land and/or surface deformations that would be indicative of damaged regions within a generated damage proxy map. Accordingly, many different combinations of sensor data and processes may be utilized for different types of disaster events as appropriate to the requirements of specific applications in accordance with embodiments of the invention.

Furthermore, the HySDS may not be algorithm-specific, and thus the system may provide a cloud-enabled generic science data system that is able to run arbitrary execution code "embarrassingly parallel" on the cloud. In several embodiments, the HySDS contains science data system processing architectural elements of workflow management, resource management, job management, data repository, and data discovery. Certain embodiments may augment these components to interface with cloud services.

With the near daily temporal sampling of the Earth's active deformation by radar systems as well as sub-daily sampling from GPS may enable tools for both scientists and non-scientists. In particular, the HySDS may be used for many different scientific purposes, including the study of earthquakes and tectonics, the evolution of magmatic systems, glacier and sea ice dynamics, mechanics of landslides, and processing controlling the migration of fluids ($CO_2$, water, oil, gas) in the shallow crust. Furthermore, the HySDS may be used for non-scientific purposes, including generating high level products, including for example, damage proxy maps that may be used by first responders in responding to a disaster (e.g., hurricane, earthquake, terrorist attack). Systems and methods for processing geodetic data to generate high level data products in accordance with embodiments of the invention are described below.

Summary of Hybrid Data Processing System Standards

Many embodiments of the hybrid science data system (HySDS) may be designed based on one or more system requirements that facilitate a low-latency processing of large volumes of geodetic data in real-time in order to generate high level data products, including one or more of the following:

1. Rapid, reliable access to data, products. Many embodiments of the HySDS provide for timely and consistent data to monitoring agencies, which enables scientists to focus on higher level analysis of data sets since they can rely on a source of processed images or time series;
2. Multiple levels of products made available for multiple levels of users, from expert to non-scientists. For example geophysicists may need a regional scale 3-D surface deformation map of an earthquake event, while responding agencies may want a high-level damage assessment map of a particular urban area;
3. Interoperable metadata. Many embodiments of the hybrid data processing system provide data and derived products that are accompanied by complete metadata to enable the correct use of them, and to be reproducible by other scientists. The metadata may be available in common standard formats for interoperability among different tools and institutions. Such metadata formats may include, but not limited to, JSON and XML serializations that adhere to the W3C PROV and GeoJSON formats for geodedetic and provenance information.
4. Easy federated discovery and search for data products, including option for data products to be pushed when available. Given the large volume of distributed data products that may be available, along with their decadal-scale temporal coverage and global coverage, many embodiments of the HySDS provide scientists and non-scientists with tools to easily discover and access these distributed data holdings; and
5. Sophisticated tools for learning about and exploring data sets and data products. Many embodiments of the HySDS provide usage instructions and tools for data sets and derived products for multiple levels of users, and further sophisticated tools for exploring the products.

Summary of Design Architecture Features

In addition to the above standards, many embodiments of the HySDS may satisfy one or more of the following design features:
1. Loosely-coupled architecture to enable rapid assimilation of new technology advancements in different components as they develop at different rates;
2. Access to elastic compute resources to ensure that the system scales to changing processing demand (e.g., in the wake of a natural disaster and the need to process the associated data);
3. Distributed data storage to facilitate low-latency data access across geographically dispersed compute nodes;
4. Interoperable metadata models and encoding formats that are infused into tools, data systems, and used across different communities;
5. Generation of higher-order data products from the observational data enabling greater understanding by cross-disciplinary communities. To service the hazards and disasters communities, "high-ordered" actionable data products can yield greater impact to societal needs;
6. Federated data discovery and access enabling scalable handling of "big data" as the expected tsunami of InSAR data alone may not be effectively handled by one data center;
7. Data product preservation and stewardship enabling product provenance, transparency, and reproducibility; and
8. Visualization environments with sufficient network and processing bandwidth to enable innovation and discoveries not otherwise possible.

Systems and methods for data processing of geodetic data using HySDSs in accordance with embodiments of the invention are discussed further below.

Hybrid Science Data System (HySDS) Overview

The hybrid science data system (HySDS) may be used to analyze geodetic data obtained from various different sensors and/or systems in order to generate high level products. Furthermore space-based geodetic measurements such as InSAR and GPS may provide new assessment capabilities on the size and location of natural disasters, including earthquakes following seismic disasters, and on volcanic eruptions during magmatic events. In particular, many embodiments of the HySDS may utilize geodetic imaging obtained from InSAR satellites due to its unique ability to capture surface deformation in high spatial and temporal detail. In addition, remote sensing with radar provides change detection and damage assessment capabilities for earthquakes, floods, and other disasters that can image even at night or through clouds, and thus high level data products may be generated regardless of time of day and/or weather conditions present during the time the satellite data was being captured.

An example of a hybrid science data system (HySDS) that may be utilized to collect low level geodetic sensor data (e.g., InSAR and/or GPS) and process this data to generate high level products in accordance with embodiments of the invention is conceptually illustrated in FIG. 1. As illustrated, geodetic data may include InSAR radar data 106 obtained from radar spacecraft 105, GPS data 107 obtained from GPS networks 115, seismic data 108 obtained from seismic networks 120, and optical data obtained from optical sensors 125. The HySDS may use an automated data collection process in order to gather the geodetic data 105-125. In some embodiments, the geodetic data 105-125 may be collected in real-time and/or when the data becomes available from different sources. The HySDS may continuously process the geodetic data and generate various different high level products, including, for example, a damage proxy map 130, a high resolution hazard assessment from fault models 135, and/or a permanent ground deformation map 140, among various other types of high level data products. The HySDS may also communicate with various potential partners and/or agencies 150 (e.g., NASA) in order to facilitate the various functionalities of the system. Although FIG. 1 illustrates an example of obtaining geodetic data from certain sensor systems to generate high level products, other sensor systems may be incorporated into the system in order to obtain geodetic data for analysis and generation of high level data products as the sensor systems and/or technology becomes available. Furthermore, although FIG. 1 illustrates an example of processing geodetic data in order to generate high-level data products (e.g., damage proxy maps after a natural disaster), other embodiments may process the data for other purposes as appropriate to the requirements of specific applications in accordance with embodiments of the invention. System architectural designs of many HySDS systems in accordance with many embodiments of the invention are described below.

Hybrid Science Data System (HySDS) Architecture

Many embodiments of the invention provide a hybrid science data system (HySDS) with an architectural design that utilizes both on-premise and cloud-based computing infrastructures in order to rapidly process large volumes of geodetic data and generate a variety of high level products for use by both scientists and non-scientists. In many embodiments, the HySDS may conduct general "up-keep" type processing using primarily the on-premise computing infrastructure, and, upon detecting a triggering event, the HySDS may automatically scale the computing infrastructure to utilize cloud-based resources in order to efficiently process the possibly large volumes of incoming data and/or the significant processing requirements needed after the triggering event to generate timely high level products immediately following the occurrence of a triggering event. Accordingly, the HySDS may utilize on-premise infrastructure for general up-keep and "burst-out" to the cloud-based processors to efficiently handle the processing that is needed for handling triggering events. By providing an elastic computing infrastructure that is capable of processing large volumes in a time efficient manner, the HySDS is able to generate high level products at a time most needed by users of the system. For example, a damage proxy map that is generated by a HySDS immediately after the occurrence of a large earthquake may provide a life saving tool for use by first responders in determining which locations of the earthquake affected region they should focus their rescue efforts to try and save people, as the damage proxy map will reveal the areas that were damaged as a result of the earthquake. The first responders may see evidence that buildings and/or other types of structures have been damaged and thus could immediately know where to focus their resources. Thus, given the importance of time with respect to when the information is available to users, many embodiments of the HySDS are able to efficiently generate high level products within an immediate timeframe upon the occurrence of triggering events.

Figure 2:
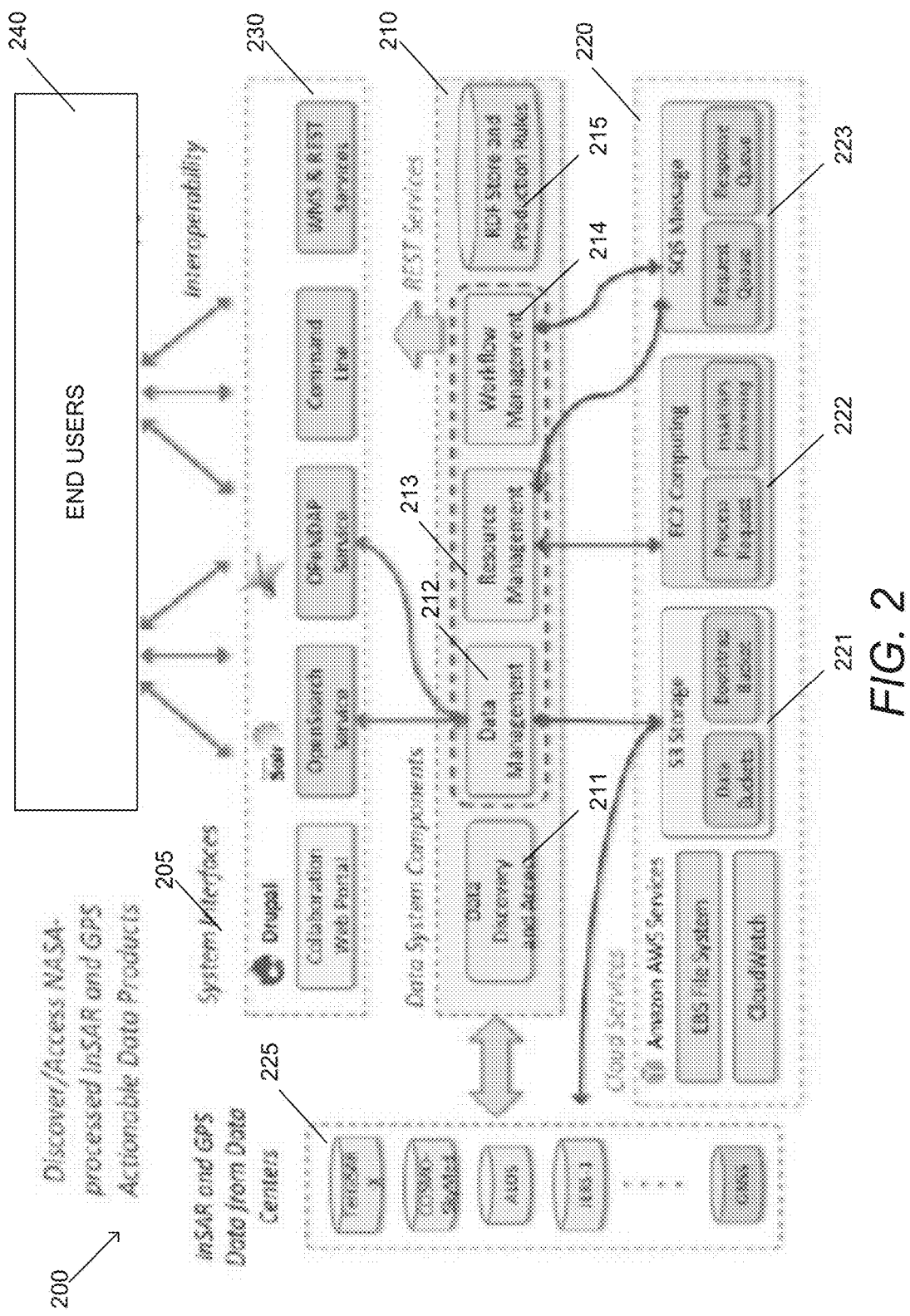
FIG. 2 is a system diagram of a cloud-based hybrid science data system (HySDS) for processing geodetic data in accordance with an embodiment of the invention.

An example of a cloud-based hybrid science data system (HySDS) for processing geodetic data in accordance with many embodiments of the invention is illustrated in FIG. 2. The HySDS 200 includes system interfaces 205, data system components 210, and cloud services 220. The HySDS 200 may communicate with geodetic sensors 225 in order to obtain different types of geodetic data. The HySDS may continuously communicate with the geodetic sensors 225 to obtain and process the geodetic data, and to generate high level products. The geodetic sensors 225 may include satellite sensors that obtain InSAR data (e.g., from Cosmo-SkyMed), GPS sensors that obtain GPS data, among various other types of sensors.

The data system components may include a data discovery and access component 211 that obtains data from the geodetic sensors 220. In some embodiments, the data discovery and access component 220 obtains geodetic data from different geodetic sensors in real-time, at certain time intervals, when sensor data is made available, and/or based on the particular output capabilities of the sensor type. For example, GPS provides temporal efficiency in allowing data to be continuously obtained in real time, while satellite data for a particular region may only be available at certain time intervals at which the satellite was positioned over the particular region (e.g., once per day).

The data management component 212 may manage (e.g., storage/access/archiving) the date obtained from the different sensor systems 225.

The resource management component 213 may manage the resources of the HySDS. The resource management component 213 may determine the current resource consumption need for processing geodetic data and the current resources available within the HySDS infrastructure, and based on this analysis, request modifications to the resources, if needed, from other sources including the cloud services 220. For example, the resource management component 213 may increase the utilization of the cloud services 220 when needed to satisfy the current processing requirements, after, for example, a triggering event has occurred (e.g., an occurrence of an earthquake). In particular, as described above, the HySDS may perform general processing using mainly the on-premise and/or minimal amounts of the cloud-based infrastructures. In many embodiments, upon detecting an occurrence of a triggering event, the HySDS may then quickly scale the infrastructure to utilize cloud-based computing resources, including many concurrent processors, in order to (1) efficiently process the large volumes of geodetic data and/or (2) provide sufficient processing power needed to generate high level products for the triggering event (e.g., generating a damage proxy map may require significant processing and computational resources). In many embodiments, in order to detect a triggering event, the HySDS may continuously monitor geodetic sensor data and determine whether the data indicates the occurrence of an event. For example, the HySDS may continuously monitor seismic data to detect the occurrence of an earthquake, upon which the HySDS may quickly scale its computing resources to the cloud to generate timely high level products.

The workflow and resource management components 214 manage the workflow of the various different processes that are processing the geodetic data. The data store and production rules 215 manages the storage of the geodetic data and/or the high level data products generated.

The cloud services #0120 may provide additional offsite elastic computational resources that may be utilized by the HySDS to process data on an as-needed basis. For example, the HySDS may process "keep up" processing on-premise and utilize the off-site elasticity (bursting) for bulk processing.

The cloud services 220 may include a data storage 221 that stores data, a computing component 222 that processes the geodetic data (e.g., InSAR and/or GPS data processing), and a message component 222 that communicates with the workflow management component 214 of the data system components #0110 to facilitate the operations of the system.

The data system component 210 may communicate with various different system interfaces 230. Each system interface may access different types of high level data products, based on the particular needs of the end users #0240. Although FIG. 2 illustrates a HySDS system architecture for processing geodetic data, any of a variety of different hybrid architectures may be utilized to process geodetic data as appropriate to the requirements of specific applications in accordance with embodiments of the invention.

Figure 3:
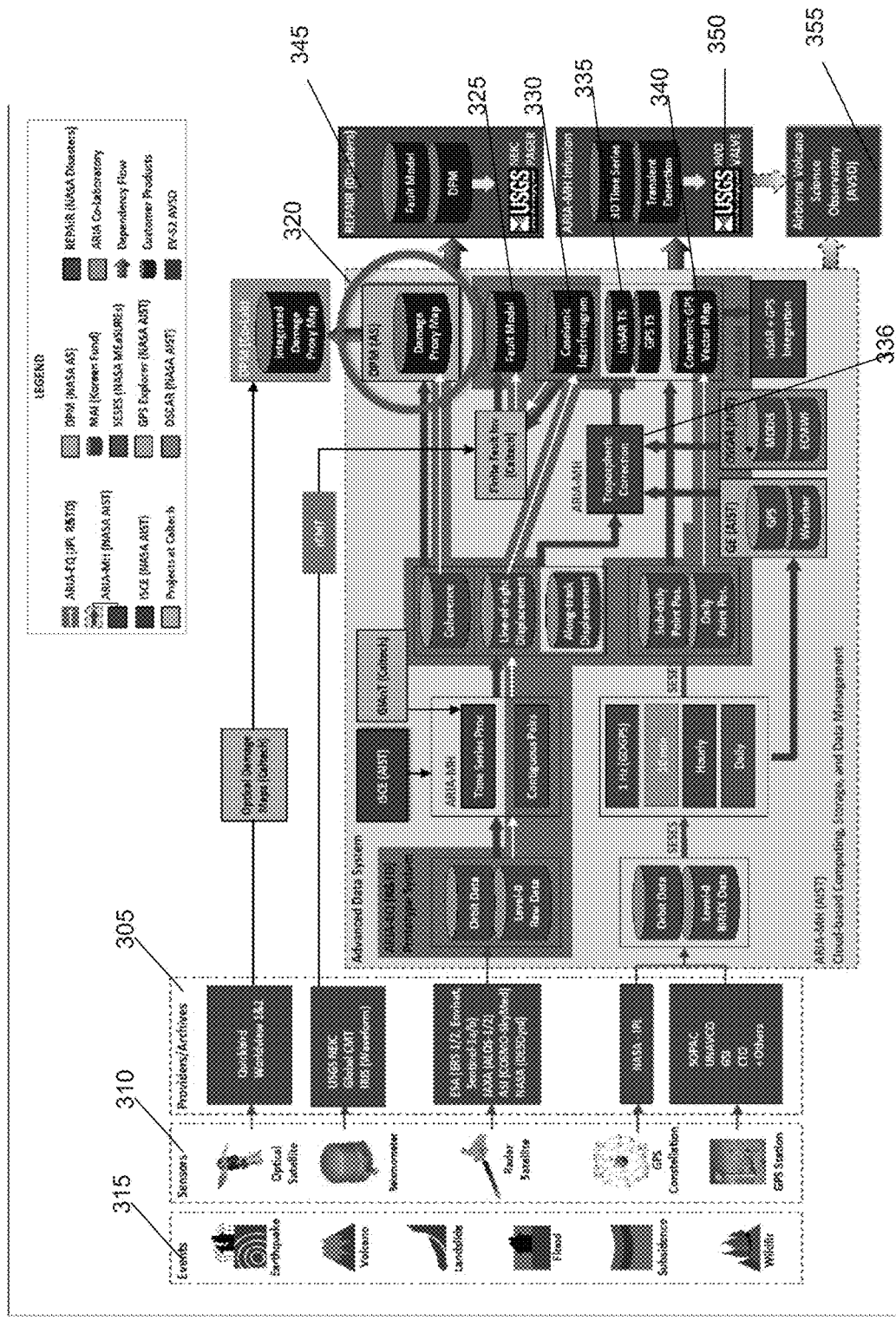
FIG. 3 illustrates a hybrid science data system architecture for generating high level products based on natural disaster events in accordance with several embodiments of the invention.

An example of a hybrid science data system architecture for generating high level products based on natural disaster events in accordance with several embodiments of the invention is illustrated in FIG. 3.

FIG. 3 illustrates several geodetic systems/providers 305 that provide various geodetic sensors 310, with each type of geodetic sensor able to monitor for different types of natural occurring events 315.

The geodetic providers 305 may include various different agencies as illustrated in FIG. 3. The agencies may include Quikbird Worldview 1&2 that provides optical satellites, USGS NEIC Global CMT IRIS (waveform) that provides seismometers, ESA (ERS-1/2, Envisat,Sentinel-1a/b) JAXA (ALOS-1/2), ASI (COSMO-SkyMed), NASA (DESDynI) that provide radar satellites, NASA-JPL that provides GPS constellations, and/or SOPAC, UNAVCO, GSI, CTO among others that provide GPS stations.

The sensors 310 may include optical satellites, seismometers, radar satellites, GPS constellations, and/or GPS stations. The natural events 315 may include earthquakes, volcano activity, landslides, floods, subsidence, and/or wildfires. The HySDS 300 may obtain the geodetic sensor data from the various providers 305 and process this data using various different processing systems.

In particular, the HySDS 300 may include various subsystems that monitor for earth land deformations using geodetic data obtained from the providers 305. The geodetic data may include orbit data and/or level 0 raw data. The HySDS 300 may generate various high level data products, including damage proxy maps 320, fault models 325, coseismic interferograms 330, interferograms corrected for tropospheric noise 336, InSAR TS and GPS TS 335, and/or coseismic GPS vector maps 340.

The high-level data products 320-340 may then be utilized by various different internal and external agencies 345-355. FIG. 3 illustrates the agencies may be, for example, the United States Geological Survey (USGS) 345 and 350, and the Airborne Volcano Science Observatory (AVSO) 355.

Although FIG. 3 illustrates an example of a system architecture for monitoring for natural occurring events based on sensor data, and processing the sensor data to generate high-level data products, any of a variety of different system architectures may be specified as appropriate to the requirements of specific applications in accordance with embodiments of the invention.

Figure 4:
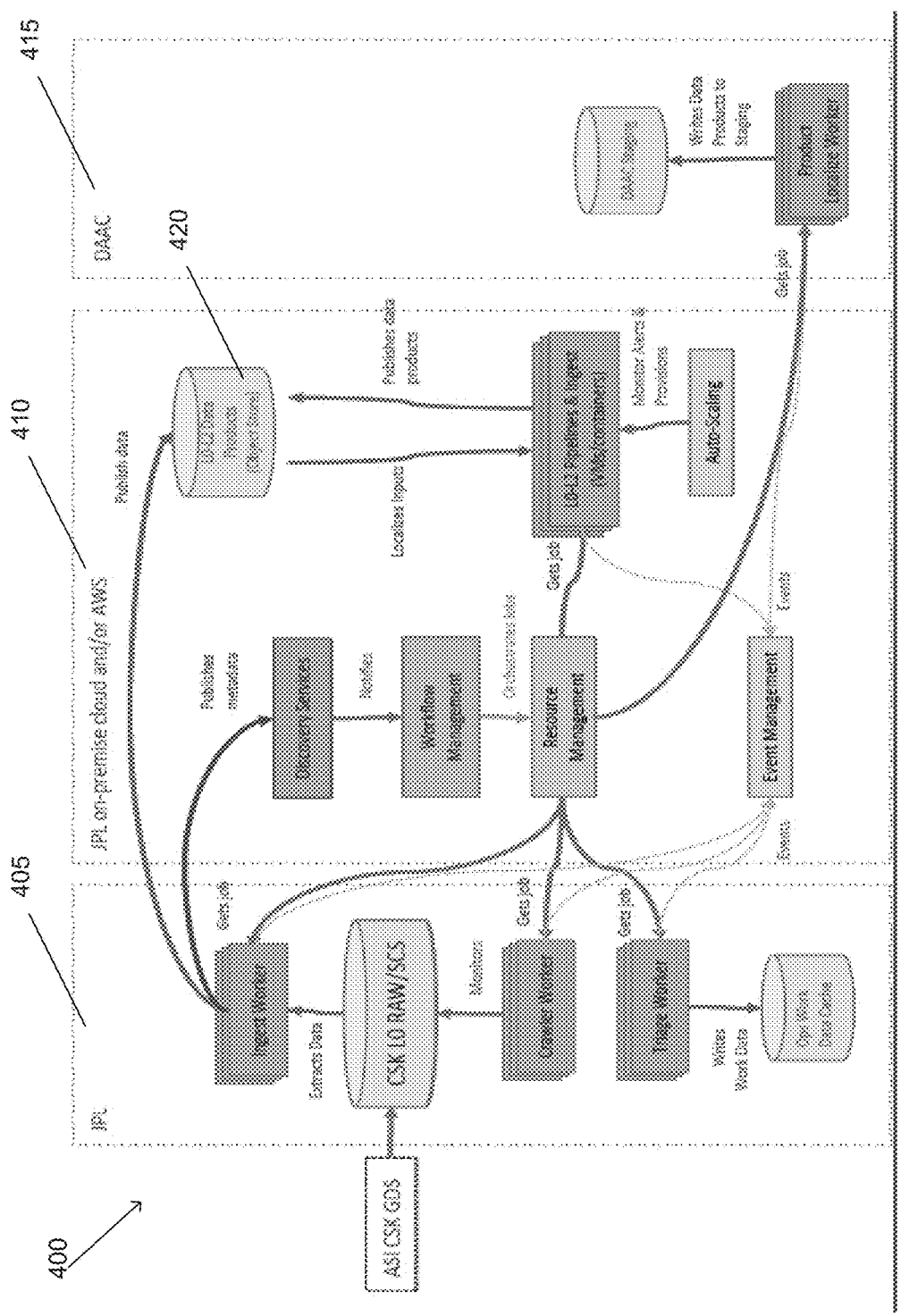
FIG. 4 illustrates a cloub-based HySDS system architecture in accordance with many embodiments of the invention.

As described above, many embodiments of the invention distribute the HySDS between on-premise and cloud-based computing data centers. An example of a distributed HySDS system architecture in accordance with many embodiments of the invention is illustrated in FIG. 4.

The HySDS 400 architecture is distributed such that the system infrastructure that may be located (1) on-premise 405 (e.g., at NASA Jet Propulsion Laboratory (JPL)) and 415 (e.g., EOSDIS Distributed Active Archive Centers (DAACs)), and/or (2) on-premise and/or on a cloud service 410 (e.g., Amazon Web Service (AWS)). In many embodiments, scalable workers may enable control over data throughput and monitoring of data movement between data centers. Furthermore, the compute and object storage may be horizontally scalable.

In many embodiments, the HySDS may automatically scale based upon identification of a need to generate data within a particular time frame in response to a triggering event. As described above, the HySDS may utilize the on-premise infrastructure 405 for general up-keep processing, and may scale to use both the on-premise and/or cloud based infrastructure 410 in order to provide sufficient computing resources needed for a triggering event. In many embodiments, the HySDS may scale between the on-premise 405 and cloud-based infrastructures 410 on an as-needed basis, without necessarily requiring the occurrence of a triggering event, based on many factors, including the volumes of incoming geodetic data, the particular processing resources needed at a particular time, among many other factors. For example, orbiting satellites may provide data regarding a particular region being monitored at only certain time intervals throughout the day (e.g., 1 time a day) and thus the HySDS may scale to use the cloud-based resources when it receives this data (and although there may be no "triggering-event" being set off by the data). However, in many embodiments, the scaling of the HySDS is particularly helpful in providing the HySDS with the ability to quickly generate high level data products after the occurrence of an event by allowing the HySDS to processes significant volumes of data using many processors executing in parallel that are made possible by the cloud-based infrastructure 410.

In numerous embodiments, the data products may be stored in cloud object stores 420. The cloud object stores 420 may specify certain redundancy and replication policies with respect to the stored data products. Furthermore, the cloud object stores 420 may be scalable high-performance storages that may be accessed through URLs. In several embodiments, in order to address export control issues, the cloud provider 410 utilized may be the AWS GovCloud.

Although FIG. 4 illustrates an example of a distributed HySDS using both cloud-services and on-premise infrastructure, any of a variety of distributed hybrid systems may be specified as appropriate to the requirements of specific applications in accordance with embodiments of the invention. Tools and features of many HySDS systems for use in analyzing geodetic data will now be described below Interferogram Processing Workflow In many embodiments, the HySDS may obtain raw geodetic data (e.g., level 0 data) and generate higher level data products (e.g., level 1 data, level 2 date, interferograms, damage proxy maps) based on the needs of a user. An example of an interferogram processing workflow that generates high level data in accordance with several embodiments of the invention is illustrated in FIGS. 5A-5B.

Figure 5A:
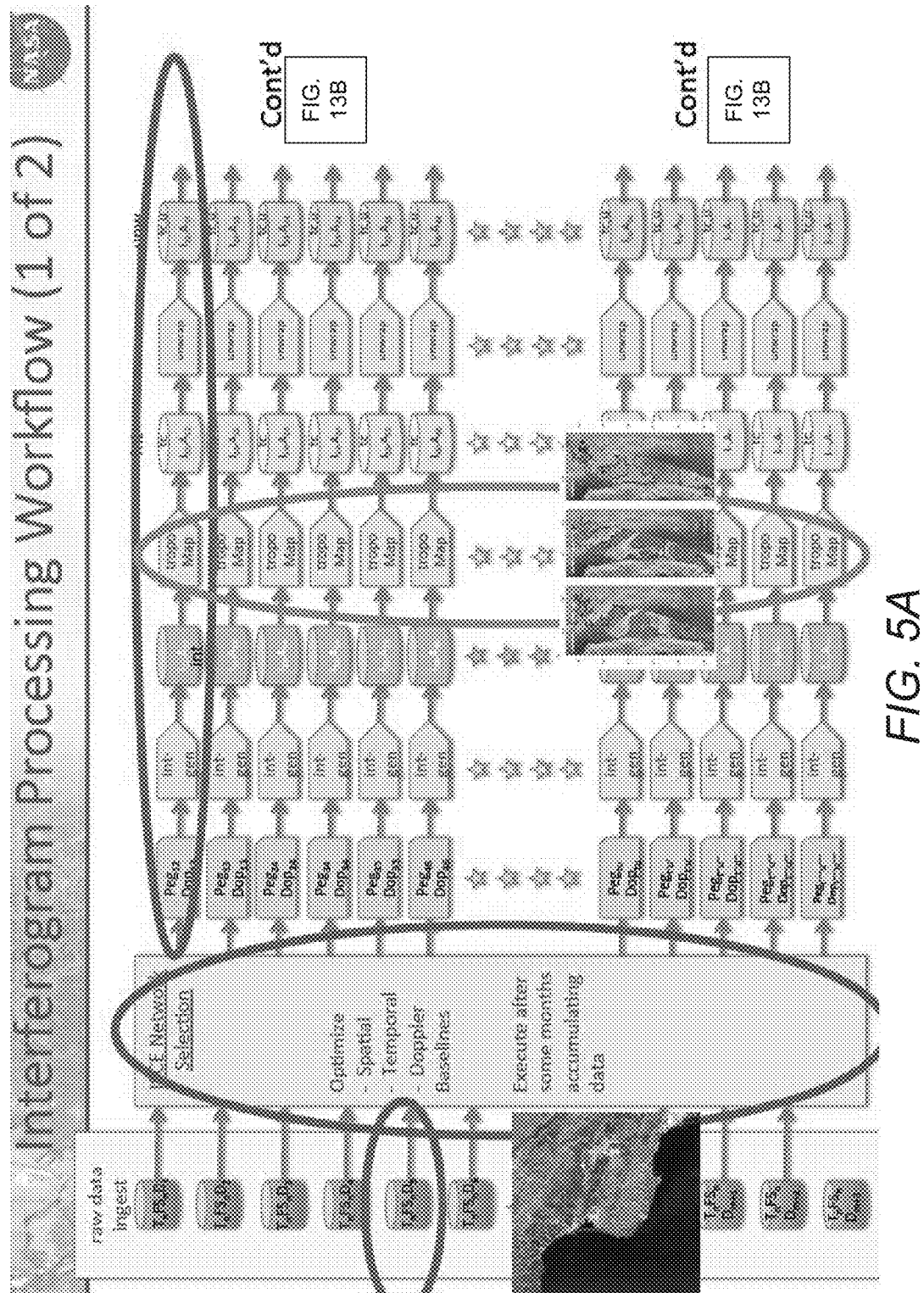
FIG. 5A-5B illustrates a interferogram processing workflow in accordance with many embodiments of the invention.
Figure 5B:
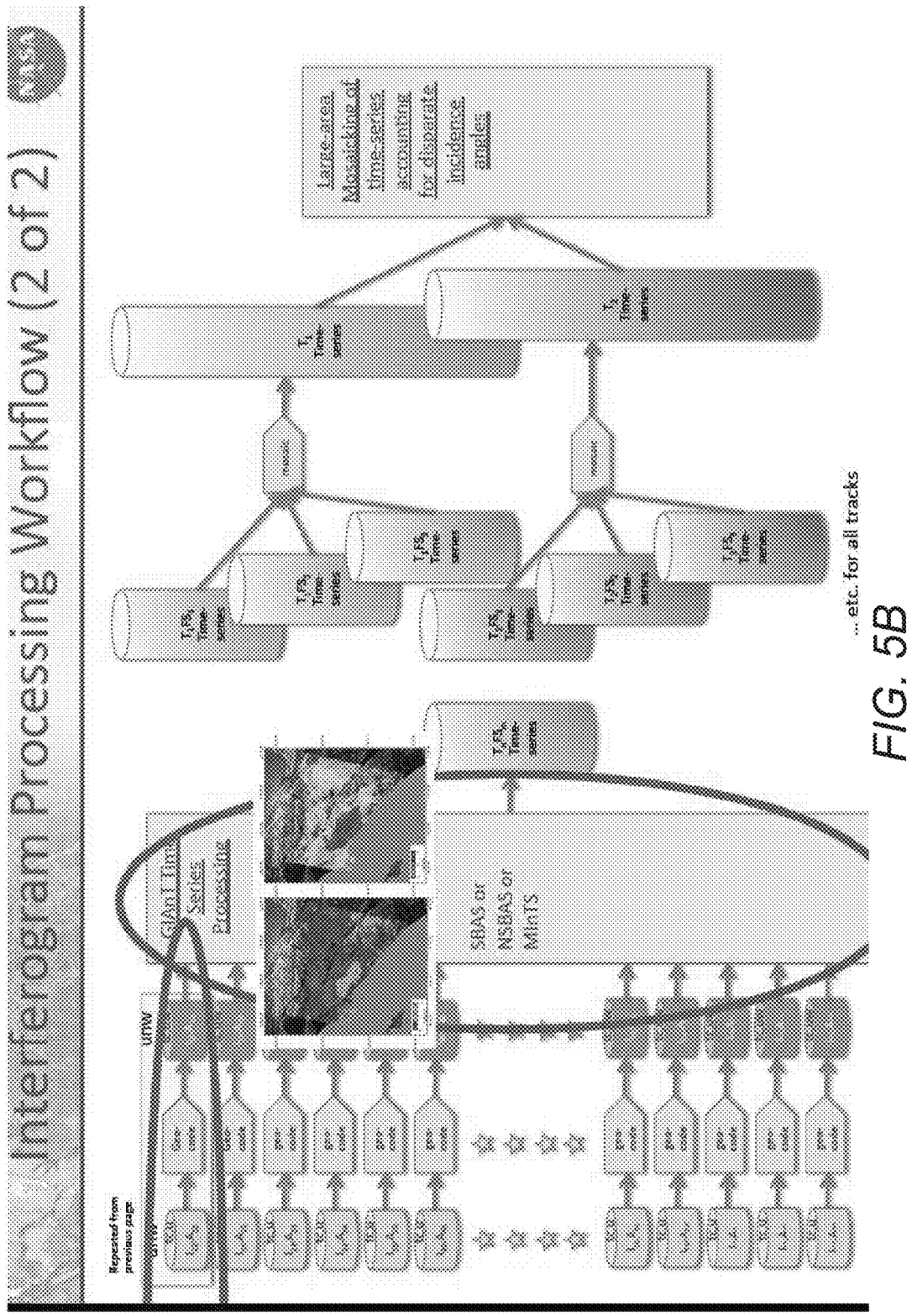

As illustrated in FIG. 5A, the ISCE Network Selection 5A05 may ingest raw data 5A10. The ISCE Network Selection 5A05 may optimize selection of the raw data sets to process, using spatial, temporal, and/or Doppler optimization criteria. In some embodiments, the ISCE Network Selection 5A05 may execute the processing of the raw data several months after accumulating the data.

The processing may be conducted in parallel for each optimized pair of raw data sets as controlled by the Peg/Dop output parameters from the ISCE Network Selection. These Peg/Dop parameters may be used to control the interferogram generation process (denoted $^3int\text{-}gen^2$) which focuses each image in a processing pair according to common Doppler parameters, estimates the misregistration of the two images, and resamples the second image of a pair to be registered with the first image based on the misregistration offsets. The resulting interferogram ($^3int^2$) may contain the measurements of surface displacement and coherence change that are the basis for the HySDS system. In many embodiments, the tropoMap function estimates from GPS array data the amount of tropospheric delay that is present in the interferogram and removes it from the interferogram. Processes for tropmap generation are described in Löfgren, J. S., Björndahl, F., Moore, A. W., Webb, F. H., Fielding, E. J., & Fishbein, E. F. (2010, July), entitled "Tropospheric correction for InSAR using interpolated ECMWF data and GPS Zenith Total Delay from the Southern California integrated GPS network. In Geoscience and Remote Sensing Symposium" (IGARSS), 2010 IEEE International (pp. 4503-4506), which is hereby incorporated by reference in its entirety.

In several embodiments, the interferogram is a discontinuous measurement of a continuous process, as the signal is estimated from complex measurement that is computed modulo 2 PI. Thus, in many embodiments, to construct a continuous measurement, the interferogram is unwrapped in two dimensions. After then, in many embodiments, $^3unwrap^2$ step, each processing pair is a tropospherically corrected, unwrapped interferogram, with associated image amplitude. (As illustrated in FIG. 5B, the last stage of FIG. 5A may be repeated.) These data may then be geocoded. Once all pairs have been processed in this way, at time series of deformation can be estimated by using the GIAnT Time Series Processing capability. In several embodiments, further geographic mosaicking of time series is possible.

Faceted Search and Data Triggers

Figure 6:
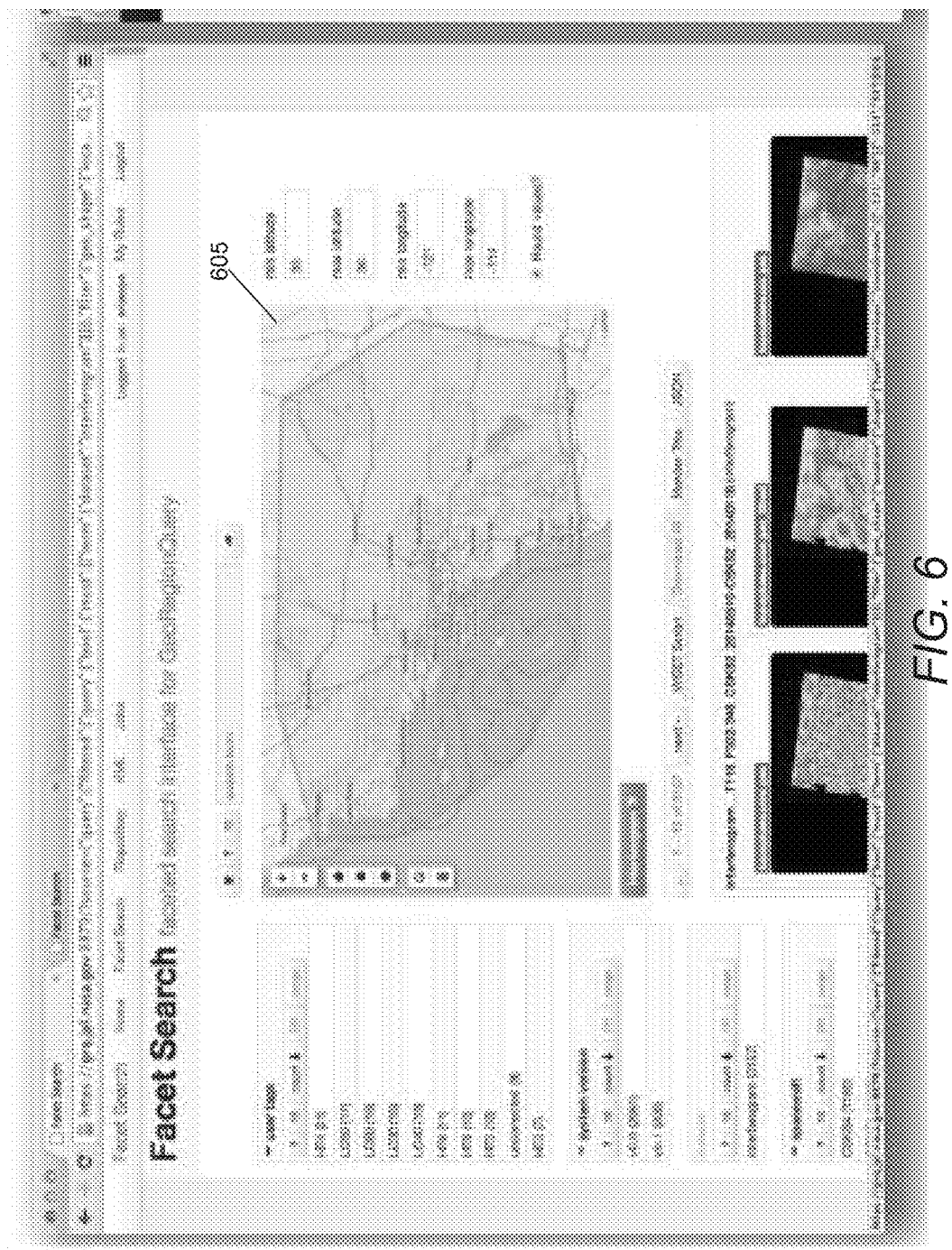
FIG. 6 illustrates an example of a user interface that may be used to specify parameters with respect to geodetic data analysis using a HySDS in accordance with many embodiments of the invention.

Many embodiments of the HySDS provide a facetted view of data products to users with tools for analyzing the geodetic data. User may "drill down" into multi-dimensional facets of the data and/or specify "triggering-events" based on the occurrence of events detected from the processing of the data. In particular, users may specify any of a variety of parameters with respect to different aspects of the data analysis, including the types of data to use (e.g., satellite InSAR data, GPS data), the particular processing algorithms to apply to the data, the type of high-level product(s) (e.g., interferograms, damage proxy maps) to generate from the data, among various other parameters. Furthermore, users may specify various conditions regarding the processing of the geodetic data, including the geospatial region(s) of interest (e.g., Los Angeles, Calif.), certain triggering events for which to begin generation of high level products while processing the data (e.g., processing seismic data and detecting an indication of an occurrence of an earthquake), among various other types of data analysis conditions. An example of a user interface that may be used to specify parameters with respect to geodetic data analysis using a HySDS in accordance with an embodiment of the invention is illustrated in FIG. 6.

The user interface 600 displays a map 605 of a region of the earth. Furthermore, a user may select a particular area on the map 605 that they are interested in monitoring. As illustrated in this example, the user may draw or select a region, illustrated as a polygon overlaid on the map, that the HySDS system should monitor with respect to geodetic data. Other embodiments may provide different tools, including bounding box, polygon, circle, and/or reverse geocoded region name for selecting a geospatial region of interest.

Furthermore, the user may specify any of a variety of parameters with respect to the monitoring and processing of geodetic data. For example a user may specify the type of event to monitor for (e.g. earthquakes, volcano activity, land deformation, fire, among other events that may cause land deformations), the location(s) to monitor the event, the magnitude of the event, among any of a variety of parameters that may be required by a particular user. The HySDS may continuously process incoming geodetic data and monitor for triggering events. For example, if a user is interested in earthquakes occurring with Los Angeles that are greater than 4.0 magnitude, the HySDS may continuously monitor seismic data for the Los Angeles area for earthquakes that are larger than 4.0, and upon identifying such a triggering event, may quickly begin the process of generating the high level data products needed by the user in a time efficient manner.

As described above, the HySDS infrastructure may scale to utilize both on-premise and/or cloud-based computing resources in response to a triggering-event that satisfies a set of conditions specified for the event (e.g., the occurrence of an earthquake within a particular region) in order to provide the capability to rapidly process the incoming geodetic data and generate information that can be utilized in responding to the event within a meaningful timeframe.

Although FIG. 6 illustrates in example of a user interface for specifying search parameters, any of a variety of user interfaces may be specified as appropriate to the requirements of specific applications in accordance with embodiments of the invention.

Damage Proxy Map Generation and Crowd-Source Verification

In many embodiments, the HySDS may be used to analyze geodetic data in order to generate a damage proxy map identifying areas that have been damaged as a result of, for example, disasters (e.g., earthquakes, hurricanes, floods). The damage proxy map may be particularly useful to first responders, such as, for example, firefighters, police, military, and other personnel that would benefit from knowing this type of information immediately upon the occurrence of the event. As described above, generating a damage proxy map in a timely manner may require processing significant volumes of data using many processors executing in parallel in order to efficiently process the data. The HySDS may process significant volumes of InSAR radar data related to a geographic region affected by a disaster, and the HySDS may analyze this data to detect changes (e.g., land deformations, surface changes) that may have taken place due to the occurrence of the triggering event. Furthemore, generating a damage proxy map for a large region (e.g., an entire city) may require significant processing resources in order to generate the map in a timely manner (e.g., within a mere few minutes and/or hours of the event), and thus the HySDS may quickly scale its computing resources to utilize a cloud-based infrastructure that is able to provide significant numbers of processors within a short time period.

Figure 7:
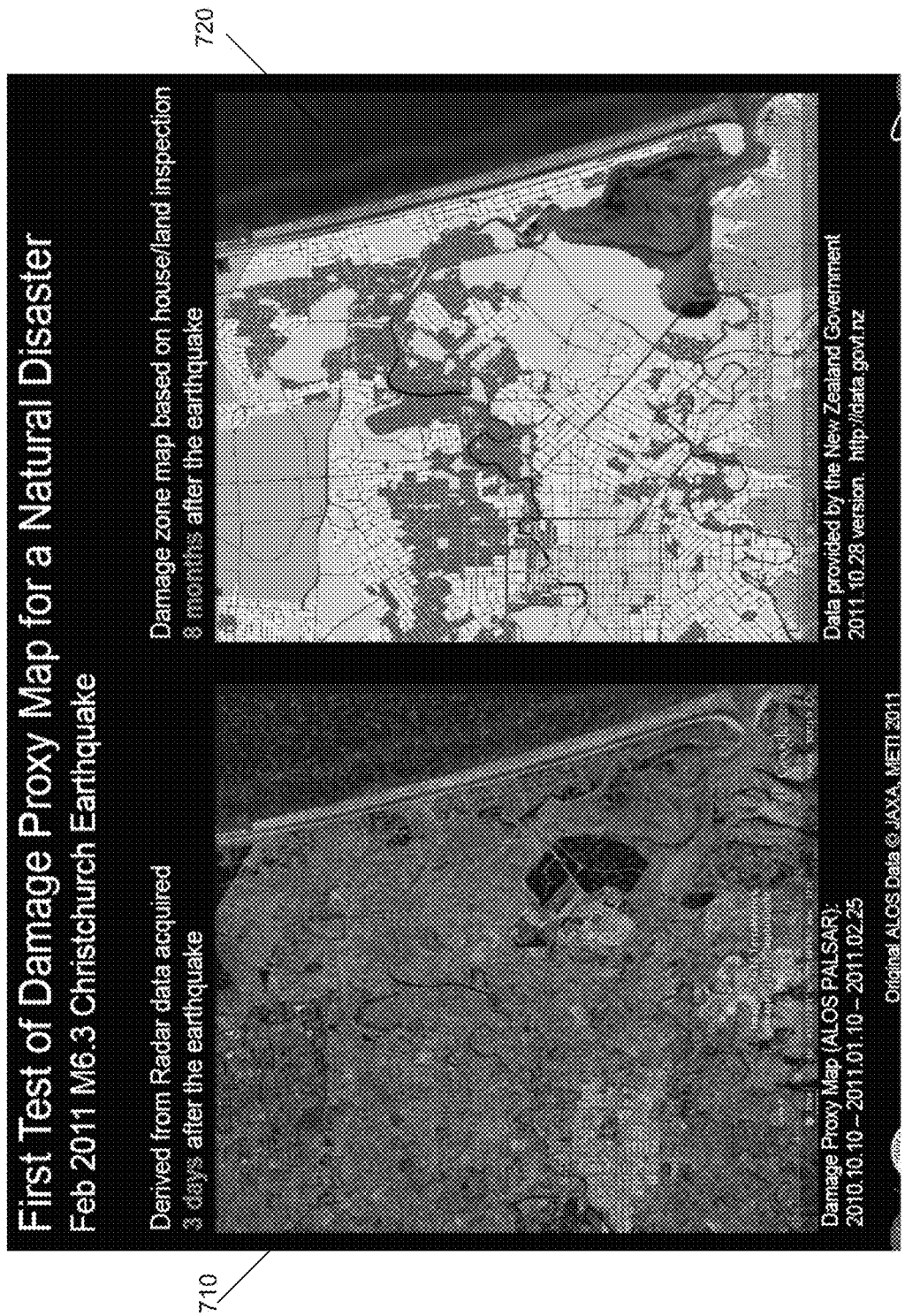
FIG. 7 illustrates an example of a damage proxy map generated from geodetic data by a HySDS in accordance with many embodiments of the invention.

An example of a damage proxy map generated from geodetic data by a HySDS in accordance with many embodiments of the invention is illustrated in FIG. 7. In this example, a damage proxy map 710 was generated by the HySDS after only 3 days of an earthquake event, while manually produced damage map 720 based on an individual human house/land inspections took 8 months to produce after the same earthquake. Thus the HySDS may be used to generate a damage proxy map based on geodetic data, which may provide the damage map within a much shorter time frame and thus provides this information at a time when it would be of much greater benefit to users.

Figure 8:
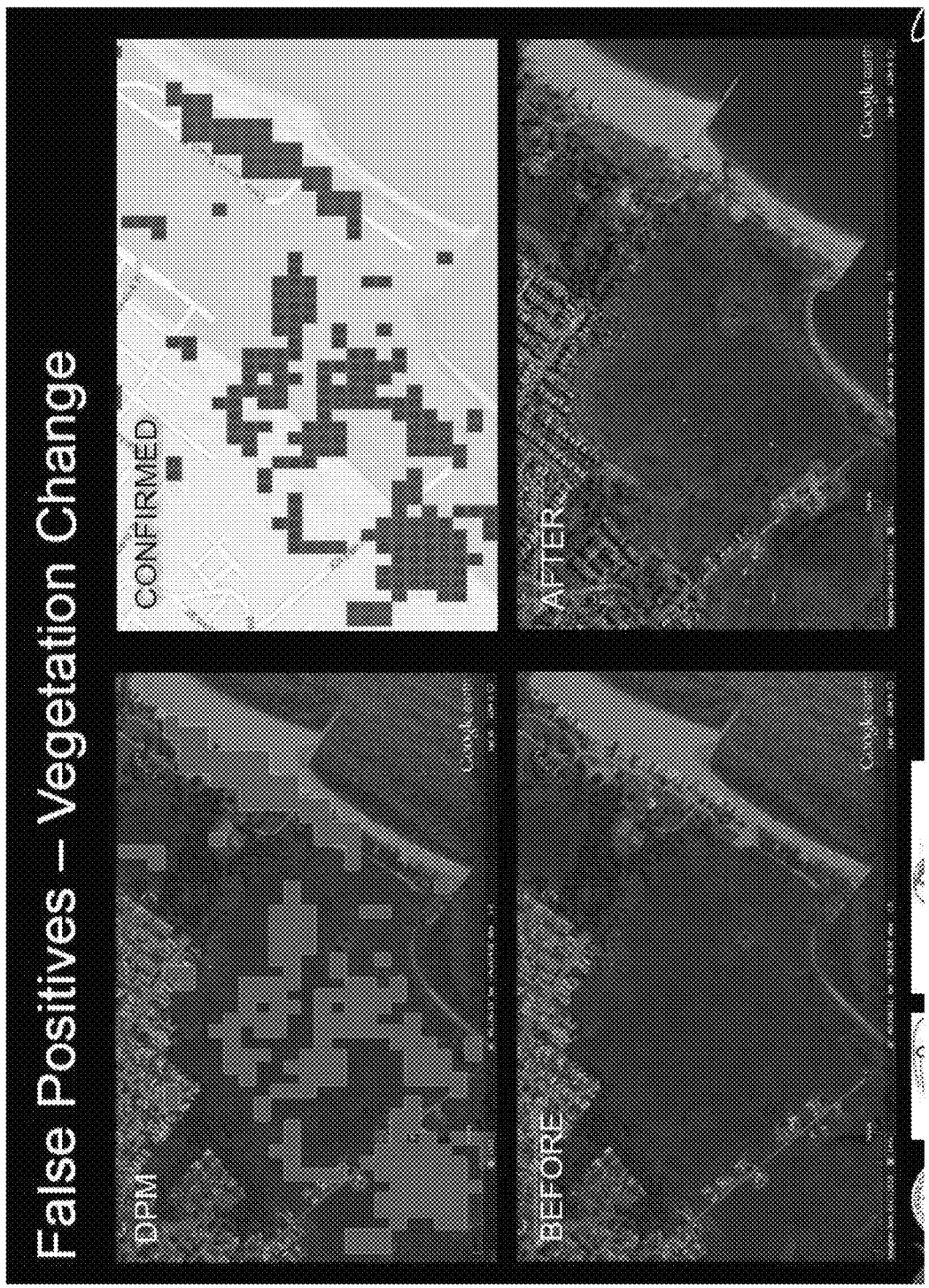
FIG. 8 illustrates a proxy map generated by a HySDS based on geodetic data that indicates a change in vegetation and/or anthropogenic change of a particular region in accordance with an embodiment of the invention.

In some embodiments, the HySDS may produce a proxy map not just after the occurrence of a natural disaster, but also when any changes have occurred to a particular region. FIG. 8 illustrates a proxy map generated by a HySDS based on geodetic data that indicates a change in vegetation and/or anthropogenic change of a particular region. The HySDS may use InSAR satellite data to identify these changes. InSAR satellite data may be particularly useful for analyzing land deformations since the data is not restricted to only being captured during a particular day-time period (which is usually a requirement for optical satellite images that cannot image at nighttime), and/or weather conditions (e.g., whether there are clouds obstructing the satellite images being captured over a particular region). In some embodiments, the HySDS may conduct an automated InSAR processing and GPS earthquake product generation using algorithms that use SAR coherence and amplitude change to image damage from an earthquake (and/or other disasters) and enhanced GPS software for automated analysis to include sub-daily processing. Upon detecting a disaster (e.g., a triggering event) the HySDS may immediately dynamically scale the computing infrastructure to utilize available cloud-based resources, as-needed, for handling the processing of the geodetic data in a time efficient manner in order to generate high level information, such as a damage proxy map, for use in responding to the event. In some embodiments, a damage proxy map may be provided in data formats that can be layered with other maps (e.g., overlaid on a Google map).

Figure 9:
FIG. 9 illustrates an interface for displaying potentially damaged regions of a map in accordance with an embodiment of the invention.

FIG. 9 illustrates an interface for displaying potentially damaged regions of a map. As illustrated, different regions may be indicated with a lined-border and the regions may be shaded with different colors based on whether the region is determined to be damaged, undamaged, whether the area is damaged with verification, undamaged with verification, has generated a true positive, false positive, and/or is uncertain. In several embodiments, the data can be communicated to the HySDS and the HySDS may annotate the regions with metadata indicating the damage status of the regions within the map.

Figure 10:
FIG. 10 illustrates an example of a "false-positive" damage proxy map region generated by a HySDS in accordance with an embodiment of the invention.

FIG. 10 illustrates an example of a "false-positive", such that the HySDS may have indicated that a region was damaged, but after actual verification (e.g., human visit to the area), the area is determined to be undamaged. As described in many embodiments, crowd-sourcing may be utilized to verify regions of a damage proxy map. For example, individual users may verify whether the damage proxy map of an area is accurate (e.g., based on the user's actual observation of an area). Crowd-sourcing may allow for large regions to be quickly verified as either damaged and/or undamaged based on a collective of many different user's individual observations of different areas of a region.

Figure 11:
FIG. 11 illustrates an example of a "true-positive" damage proxy map region generated by a HySDS in accordance with an embodiment of the invention.

FIG. 11 illustrates an example of a "true-positive" such that the HySDS may have indicated that a region was damaged, and this damage was verified based on an actual in-person survey of the region.

Figure 12:
FIG. 12 illustrates an example of an "uncertain" damage proxy map region generated by a HySDS in accordance with an embodiment of the invention.

FIG. 12 illustrates an example of an "uncertain" region such that the HySDS may indicate that certain regions of a map are uncertain as to whether or not damage may have occurred within these regions. This may be helpful, for example, for allowing first responders with the ability to prioritize the order in which aid should be given to different regions. For example, if a region is damaged with a high level of certainty, the first responders may go there first, and then go to the uncertain regions when they have the time and resources available.

Although the present invention has been described in certain specific aspects, many additional modifications and variations would be apparent to those skilled in the art. It is therefore to be understood that the present invention may be practices otherwise than specifically described. Thus, embodiments of the present invention should be considered in all respects as illustrative and not restrictive.

Furthermore, the foregoing discussion discloses and describes merely exemplary embodiments of the present invention. One skilled in the art will readily recognize from such discussion and from the accompanying drawings that various changes, modifications and variations may be made therein without departing from the spirit and scope of the invention. Therefore, it is intended that the invention may not be limited to the particular embodiment disclosed, but that the invention will include all embodiments falling within the scope of the appended claims.

What is claimed is:

1. A hybrid data system (HySDS) for processing geodetic data, the HySDS comprising:
    an on-premise cloud science data system infrastructure that communicates with an external cloud-based system infrastructure, the HySDS infrastructure comprising a plurality of processors configured to communicate with memory, wherein the memory contains computer instructions that direct the plurality of processors to:
    monitor availability of geodetic data from distributed data centers and characterization of the geospatial extents and instrument sensor metadata;
    monitor raw geodetic data sensed by at least one geodetic sensor based on a plurality of parameters, wherein the monitoring comprises analyzing the raw geodetic data for triggering events;
    detect an occurrence of a triggering event based on the monitoring of the raw geodetic data;
    collect raw geodetic data for analysis from a plurality of geodetic sensors upon the occurrence of the triggering event including obtaining a plurality of satellite images, wherein a first set of geodetic sensors are utilized for a first type of triggering event and a second set of geodetic sensors are utilized for a second type of triggering event;
    determine a time threshold by which at least one high level data product for the particular triggering event is to be generated upon occurrence of the triggering event;
    determine that the current available on-premises resources of the HySDS are insufficient for processing of the raw geodetic data within the time threshold and communicate with the external cloud-based system infrastructure in order to allocate additional computing resources available on the cloud-based system infrastructure based on an estimate of computing resources needed to process the geodetic data to generate the at least one high level product within the time threshold; and
    process a subset of the raw geodetic data using a plurality of processors located within the on-premise infrastructure; and
    process in parallel a subset of the geodetic data using a plurality of processors executing in parallel located on the external cloud-based infrastructure; and
    generate the at least one high level product based on the processing of the geodetic data.

2. The HySDS of claim 1, wherein the raw geodetic data provides information regarding a ground surface.

3. The HySDS of claim 1, wherein the raw geodetic data measures surface deformations and movement of a ground surface.

4. The HySDS of claim 1, wherein the raw geodetic data is data selected from the group consisting of interferometric synthetic aperture radar data (InSAR), seismic data, and global position data.

5. The HySDS of claim 4, wherein the InSAR data measures a signal phase change between a plurality of images over a particular area of a ground surface at different times such that it is able to detect a movement of a point on the ground surface.

6. The HySDS of claim 5, wherein the detected phase change is corrected for the amount of delay caused by tropospheric water vapor, using GPS array and weather model data.

7. The HySDS of claim 1, wherein the triggering event is an imminent increase in volume of geodetic data.

8. The HySDS of claim 1, wherein the triggering event is a disaster that causes a land deformation in a particular region.

9. The HySDS of claim 8, wherein the disaster is a disaster selected from the group consisting of a fire, an earthquake, a tsunami, a tornado, a hurricane, a volcanic event, a flood, a mud-slide, and a terrorist attack.

10. The HySDS of claim 9, wherein the disaster is an earthquake, wherein the geodetic data provides deformation measurements that allow for computing a location and extent of a fault rupture.

11. The HySDS of claim 1, wherein the high level product is selected from the group consisting of a damage proxy map, an interferogram, a time series velocity map, a coherence map, and an advisory alert.

12. The HySDS of claim 1, wherein the high level product is a damage proxy map, wherein the memory further directs the processor to obtain data from a plurality of devices regarding statuses of a plurality of regions within the damage proxy map.

13. The HySDS of claim 12, wherein a status of a region in a damage proxy map is selected from the group consisting of damaged, undamaged, uncertain, damaged and verified, and undamaged and verified.

14. The HySDS of claim 1, wherein the memory further directs the processor to integrate data from a plurality of geodetic data sensors.

15. The HySDS of claim 1, wherein the plurality of parameters for monitoring the geodetic data is specified by a user.

16. The HySDS of claim 1, wherein determining that the current available on-premises resources of the HySDS are insufficient for processing the raw geodetic data further comprises detecting an imminent increase in data from the plurality of geodetic sensors.

17. The HySDS of claim 1, wherein the cloud-based system infrastructure is provided by an external provider.

18. The HySDS of claim 1, wherein the memory further directs the processor to integrate raw geodetic data from a plurality of geodetic data systems and processing the integrated raw geodetic data to generate at least one high level product.

19. The HySDS of claim 1, wherein the memory further directs the processor to:
   determine that a set of currently available resources of the cloud-based infrastructure are not being used; and
   scale down the cloud-based infrastructure to release the set of unused resources back to an on-premise or external provider.

20. The HySDS of claim 1, wherein the cloud-based system infrastructure monitors the raw geodetic data being sensed by the at least one geodetic sensor.

21. The HySDS of claim 1, wherein the memory further directs the processor to process the raw geodetic data concurrently using a plurality of processors of the on-premise and cloud-based system infrastructures.

22. The HySDS of claim 1, wherein the memory further directs the processor to:
   retrieve raw geodetic data from an archive database upon detecting the occurrence of the triggering event; and
   process the retrieved raw geodetic data and new incoming raw geodetic data to generate the at least one high level product.

23. The HySDS of claim 22, wherein the retrieved raw geodetic data comprises InSAR data for a particular region prior to the occurrence of the triggering event.

24. The HySDS of claim 1, wherein the memory further directs the processor to publish the at least one high level product, wherein the at least one high level product is accessible by a user.

* * * * *

UNITED STATES PATENT AND TRADEMARK OFFICE
CERTIFICATE OF CORRECTION

| | | |
|---|---|---|
| PATENT NO. | : 10,145,972 B2 | Page 1 of 1 |
| APPLICATION NO. | : 14/828348 | |
| DATED | : December 4, 2018 | |
| INVENTOR(S) | : Susan Ethel Owen et al. | |

It is certified that error appears in the above-identified patent and that said Letters Patent is hereby corrected as shown below:

On the Title Page

Item (72), Fifth inventor: "Hook Kian Hua" should read -- Hook Kien Hua --.

Signed and Sealed this
First Day of October, 2019

Andrei Iancu
*Director of the United States Patent and Trademark Office*